United States Patent [19]

Gorman

[11] Patent Number: 5,937,626
[45] Date of Patent: Aug. 17, 1999

[54] HAND-HELD FRUIT PICKING TOOL

[76] Inventor: Timothy Gorman, 9175 Batesville Rd., Afton, Va. 22920

[21] Appl. No.: 08/879,006

[22] Filed: Jun. 19, 1997

[51] Int. Cl.⁶ ....................................................... A01D 1/06
[52] U.S. Cl. ................................ 56/239; 56/241; 56/331; 30/173; 30/294
[58] Field of Search ......................... 56/331, 339, 328.1, 56/233, 239, 241, DIG. 17, DIG. 20; 47/1.01; 30/294, 173, 279.2

[56] References Cited

U.S. PATENT DOCUMENTS

| 964,788 | 7/1910 | Keating | 56/331 X |
|---|---|---|---|
| 1,042,240 | 10/1912 | Lillick | 56/331 |
| 1,101,331 | 6/1914 | Reinoehl | 56/331 |
| 3,365,798 | 1/1968 | Cunningham | 30/294 |
| 4,432,138 | 2/1984 | Piccolo, Jr. | 30/294 |
| 4,805,307 | 2/1989 | Lucas, Jr. et al. | 30/294 |

Primary Examiner—Terry Lee Melius
Attorney, Agent, or Firm—Young & Basile, P.C.

[57] ABSTRACT

A hand-held device for picking fruit which includes an elongated grip member and a head member connected to the elongated grip member which includes a pair of fixed immovable blades. Each blade has a cutting edge. The blades are positioned in the head in opposed planar relationship to one another so that at least a portion of each respective cutting edge is in spaced opposed relationship to the cutting edge of the other blade at a distance less than the thickness of the stem of the fruit to be picked. Picking is accomplished by a thrusting motion in which the device is held in one of the laborers hands while the fruit to be picked is grasped in the other. The device is thrust at the stem of the fruit to be picked. The pair of fixed blades guides the stem into the cutting region where the stem is severed. The fruit can be removed by the hand holding it during the cutting operation.

18 Claims, 2 Drawing Sheets

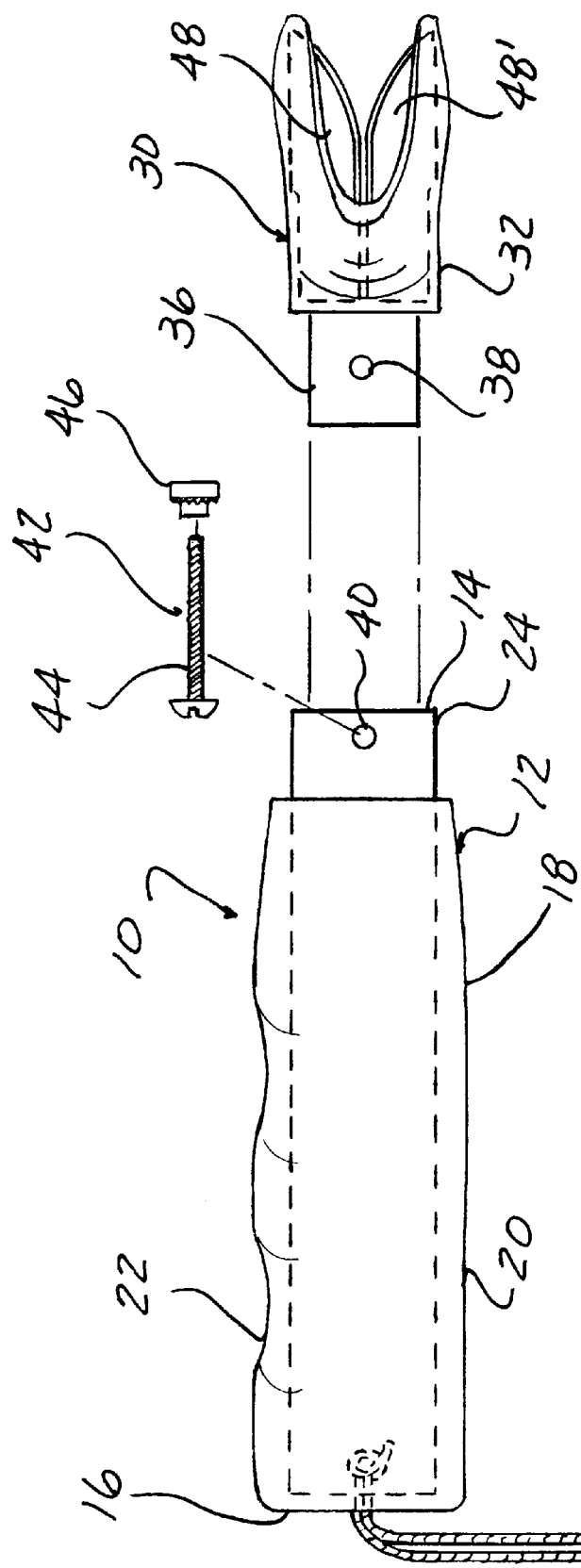
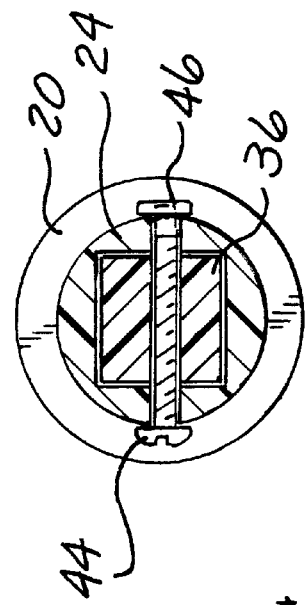
FIG-3
FIG-4

HAND-HELD FRUIT PICKING TOOL

FIELD OF THE INVENTION

This invention pertains to hand-held devices for harvesting small fruit, particularly fruit with vitrifide stems.

BACKGROUND OF THE INVENTION

The need for rapid, efficient and economical fruit harvesting operations is virtually indisputable. Most small fruits, such as grapes, peaches, tomatoes, berries, etc., require speedy and careful handling and processing in order to maintain maximum flavor, freshness and taste. This is particularly important in harvesting wine grapes where speedy and careful handling is essential to maintain maximum flavor and freshness.

On large land tracks, extensive planting of small fruits such as wine grapes permit the use of large, expensive harvest machines. In certain regions such as areas of California, these expensive machines have largely supplanted manual harvesting. Yet, even where machine harvesting has proven to be cost-effective, many wine makers remain interested in hand-picked produce because it gentles the fruit, yielding produce better suited for wine making.

In the Eastern United States, small orchards and vineyards predominate. In such areas, machine harvesting is inappropriate and is comparatively rare. In some states, such as Virginia, the average vineyard is approximately five acres. At such small establishments, self-propelled or tractor-drawn mechanical grape harvesters are cost prohibitive and all grapes are picked by hand. Similar situations can exist for other produce such as peaches, tomatoes, berries, etc.

The hand-picking of wine grapes is labor intensive and exposes the vineyard owner to many unanticipated expenses beyond that incurred for basic labor during harvest. The vineyard owner often cannot anticipate the vagaries of ripening or weather. The risk to the vineyard owner is increased because grapes can proceed from ripe to rot in one day. Each grape variety tends to mature around a specific date in any given region, leading to competition for labor at the preferred harvest time for the given grape variety. All too often, a small grower finds that he must enlist the assistance of his family and friends to ensure that his grape crop is gathered and delivered to the winery without costly and deleterious delays. Cut grapes aspirate rapidly, losing weight. Additionally, enzymes start converting grape juices to vinegar as soon as the stem is cut. Thus, small producers who represent the numerical majority in the business, have a strong interest in providing means whereby even inexperienced pickers are capable of harvesting in a rapid, safe and efficient manner.

The usual method of manual harvesting of fruits such as grapes involves the use of a pair of sharp pointed scissors or shears. These shears have a double blade and a means for holding the blades in the open position; generally a biasing spring or the like. Compressive force exerted on the handles causes the blades to contact one another, severing anything interposed between the two blade surfaces. The picker holds these shears in his dominant, usually right, hand. The fruit to be harvested is grasped in the picker's other hand, and the bunch stem snipped by the shears. Grape bunches are picked one by one, each deposited in a basket, or lug, lying at the picker's feet. The picking action requires significant eye to hand coordination, particularly when the fruit is obscured behind plant foliage. Such obstruction often results in self-inflicted wounds from the shears, for frequently, the picker's eye misperceives where his other hand is actually located. This type of injury is so common that some growers require their pickers to tape their forefingers before beginning harvesting.

Scissors or shears have other disadvantages. The grape harvesting action using scissors frequently severs vine parts other than the bunch stems. This limits pruning choices for the following season. Additionally, the scissors or shears are mechanically complex and easily jam with fruit juice and sap after extensive use. Scissors or shears occupy the picker's dominant hand fully during operation. Even if they are tethered to the wrist, they are awkward to drop and regrasp safely. Finally, scissors or shears demand maintenance, requiring pre-use and post-use sharpening, lubrication and cleaning.

In U.S. Pat. No. 5,440,866 to Gorman, the present inventor developed and disclosed an alternative tool for harvesting fruit. The device could be mounted on either the right or left hand of the user generally between the index and second finger. The device included a cutting blade which was attached to a central strip member and extended angularly outward therefrom. When the device inserted between the finger or fingers of the picker, the blade could be brought into contact with the stem of a fruit to be harvested by a grasping motion of the picker's hand.

It can be appreciated that even in light of this development, improved hand-held picking devices are still highly desirable. It is desirable to provide a device which can be easily grasped and/or removed from the hand of the user. It is also desirable that such a device enable a picker to sever the stem of the fruit without crushing or damaging the fruit and retain it in the picker's hand for subsequent deposit into an appropriate gathering container. It is further desirable that the device optimize the cutting of the often-vitrified stem of the grape bunch close to the juncture between the fruit and the vine while minimizing the risk of slashing other important vegetative growth. It is further desirable that the device be easily positionable in the hand and be capable of being used effectively without excessive manipulation in a manner that contributes to the ergonomic efficiency of harvesting operations. Finally, it is desirable that the device be easy to maintain in optimum use condition.

SUMMARY OF THE INVENTION

The present invention is a hand-held device for harvesting stem containing fruits such as bunches of grapes. Such fruit will often have a vitrified stem which is difficult to cut and will frequently grow in positions on the tree, plant or vine which are awkward to reach for harvesting.

The cutting device of the present invention includes a head in which a pair of blades having cutting edges are fixedly mounted such that the respective cutting edges are in an essentially V-shaped array. The edges of the respective blades opposed to the cutting edges are, preferably, enclosed in guard sheaths integrally formed with the head. The head is attached to a grip or handle member by any suitable means such as a set screw or the like. The attachment means preferably permits releasible attachment and replacement of the head in the grip. The grip has an essentially cylindrical body having a diameter sized for comfortable grasp within the palm of the dominant hand of a picker. Distal to the point of attachment of the head is a suitable loop attached to the grip and extending outward therefrom. The loop is of sufficient size to extend comfortably around the wrist of the picker and permit the hand-held device to depend therefrom when not being grasped in the operative position.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description presented herein makes reference to the accompanying drawings in which like reference numerals refer to like parts throughout the several views and wherein:

FIG. 3 is an exploded view of the hand-held fruit picking tool of FIG. 1 with the grip element being shown in phantom;

FIG. 4 is a cross-sectional view taken along the 4—4 line of FIG. 2.

DESCRIPTION OF THE PREFERRED EMBODIMENT

Figure 1:
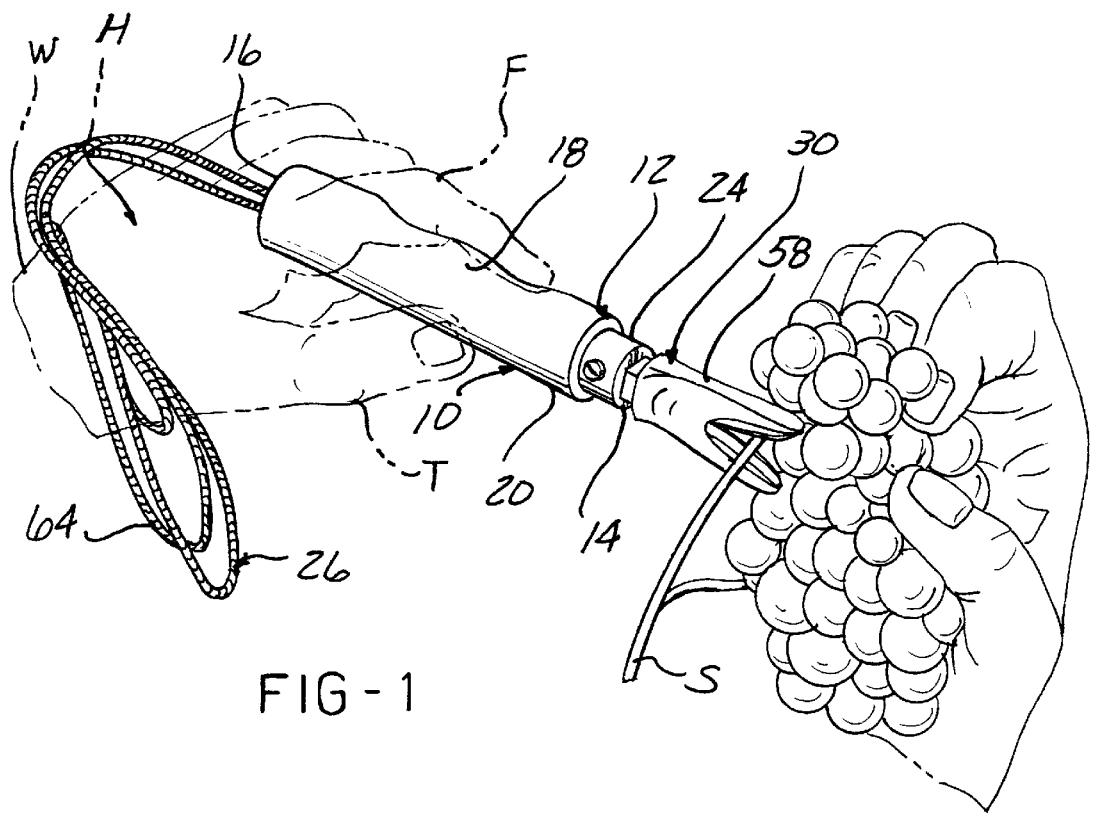
FIG. 1 is a perspective view of the hand-held fruit picking tool of the present invention as grasped during use.

The device 10 of the present invention includes a grip 12 which has a first end 14 and an opposed end 16. As shown in FIG. 1, the grip 12 preferably is composed of a body adapted to be easily grasped in the palm of a picker such that the first end 14 extends outward from the picker's hand H proximate to the thumb T and forefinger F and the second end is adjacent to or extend outward beyond the opposed region of picker's hand H. The grip 12 may be configured in any ergonomically appropriate shape. As depicted in FIGS. 1 and 3, the grip 12 has an elongated, central body 18 having a suitable length and width to be received easily in the palm of the user. The central body 18 may have any suitable cross-sectional profile and may be constructed of any suitable material with suitable lightweight materials which are resistant to corrosion or other environmental degradation being preferred. As depicted in the drawing Figures, the central body 18 has an essentially circular cross-sectional profile and is constructed from suitable plastic tubing stock. The central body 18 may be enclosed in an outer sheath 20 constructed from any suitable resilient cushioning material such as rubber, nylon or the like. The outer sheath may have suitable indentations 22 for increased finger placement comfort as shown in FIG. 3 if desired. In the preferred embodiment, the outer sheath 20 is a hollow tubular member having a first end defining an aperture which permits access to a hollow cavity defined in the outer sheath 20 in which the central body 18 is matingly received. As depicted in FIG. 3, the outer sheath 20 also includes a flat planar surface 22 which is coextensive to the second end 16 of grip 12. It is to be understood that it is within the purview of this invention to configure the grip 12 such that a terminal end of central body 18 defines the second end 16.

As depicted in FIGS. 1 and 3, the grip 12 also includes member 24 which protrudes outward from the outer sheath 20 and defines first end 14. outwardly protruding member 14 is, preferably, adapted to provide an attachment point between grip 12 and head 30 in a manner to be described subsequently.

The hand-held device 10 of the present invention can also include a suitable tether 26 attached to the grip 12 proximate to the second end 16. As shown in FIGS. 1 and 3, the tether device is a braided rope material configured to form a loop when attached to the grip 12. The tether device, preferably, provides a loop of sufficient size to easily depend from the wrist W of the user when the grip 12 is not grasped in the user's palm.

Figure 2:
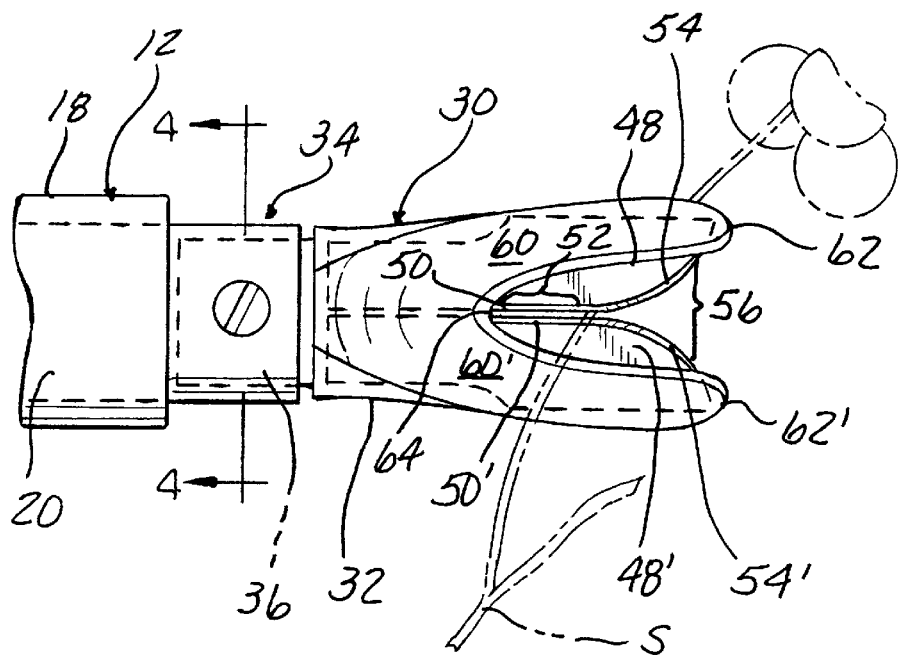
FIG. 2 is a side view of the hand-held fruit picking tool of FIG. 1 in which the blades of the device are shown in engagement with the stem of a grape bunch.

The device 10 of the present invention includes head 30 connected to the first end 14 of grip 12. As shown in detail in FIG. 3, and in phantom in FIG. 2, the head 30 preferably has a central body portion 32 and a suitable means 34 for securing head 30 to grip 12 connected thereto. In the preferred embodiment, this securing means 34 includes protrusion 36 adapted to be telescopically received inside a hollow opening defined in outwardly protruding end 24. In the preferred embodiment as depicted in FIGS. 2 and 4, the protrusion 36 is of sufficient depth to extend telescopically into the central region of outwardly protruding end 24.

The protrusion 36 is constructed with any suitable cross-sectional profile which will permit mating secure reception in the opening defined in outwardly protruding end 24. In the preferred embodiment as depicted in FIG. 4, the cross-sectional profile of the protrusion 36 is rectilinear and is matingly received in a compatibly configured rectilinear opening in the outward protrusion 24 so as to automatically orient the head 30 relative to grip 12.

A transverse bore 38 extends through protrusion 36 and is matingly aligned with corresponding apertures 40 located on opposed surfaces in the outwardly protruding end 24. Suitable mechanical attachment means 42 such as screw 44 and mating lock washer 46 can be employed. A screw 44 extends through first aperture 40 and through associated transverse bore 38 terminating at the outer end of the opposed aperture in the outwardly protruding end 24 (not shown). The distal end of screw 44 is fastened by a suitable fastening member such as lock washer 46.

Releasible, removable attachment of the head 30 is preferred for reasons of economy, and extended lifetime of the device. However, it is to be understood that it is within the purview of this invention to provide for permanent attachment of the head 30 to grip 12 in situations where replacement of head 30 on grip 12 is not warranted or desired.

In the device 10 of the present invention, the head 30 includes a pair of fixed blades 48, 48'. The blades 48, 48' are positioned in spaced planar relationship to one another and, preferably are permanently mounted in head 30. Each blade has an associated cutting edge 50, 50' positioned such that the respective cutting edges 50, 50' are in spaced opposed relationship in the manner illustrated in FIGS. 1, 2 and 4. In the device of the present invention, at least a portion of the cutting edges 50, 50' are in spaced essentially parallel relationship to one another so as to define a primary cutting region 52 such that the distance between the respective cutting edges is less than the thickness of the stem of the fruit to be picked. In applications where the device 10 of the present invention is to be employed in harvesting grapes, this spaced distance between cutting edges 48, 48' can be between about 1/32 "and about 1/8".

While it is preferred that the cutting edges 48, 48' be in parallel spaced opposed relationship to one another, the cutting edges 48, 48' can be oriented to meet at the region closest to the mounting point in head 30, if desired.

Preferably, the fixed blades 48, 48' also include additional cutting edges surface 54, 54' which define a guide region 56 and preliminary cutting region. This region 56 is characterized by a gradually widening space between the respective additional cutting edges 54, 54'. In the preferred embodiment, the fixed blades 48, 48' are paired convex curved blades which are arrayed in an approximate V-shape. The maximum opening defined by the curved blades may be any size which will suitably and accurately capture and convey the associated stem S into the primary cutting region 52. Preferably, the maximum opening defined by the fixed convex curved blades is no greater than the maximum width of the grip 12.

As depicted in the embodiment shown in FIGS. 1, 2 and 3, head 30 is configured so as to encase fixed blades 48, 48' therein. In the preferred embodiment, the head 30 has arms 56, 56' integrally connected to and extending outwardly from central body portion 32 at a location generally opposed to means 34 for connecting head 30 to grip 12. The arms 56, 56' are positioned in diverging planar relationship to each other so as to form an inlet opening in head 30. The arms 56, 56' have curved contoured outer surfaces 58, 58' continuously extending from central body 32 over the central region 60, 60' of arms 56, 56' and terminating in blunt forward regions 62, 62' at the outermost distal points of head 30.

The pair of fixed blades 48, 48' are mounted in head 30 such that a first portion of each blade is encased in central body 30 in the manner shown in FIG. 2. Arms 56, 56' encase surfaces of fixed blades 48, 48' opposed to the respective cutting edges. The arms 60, 60' surround the respective fixed blades 48, 48' both on the front surface as shown in FIGS. 2 and 3 and the rear surface (not shown) in an essentially symmetrical manner. As shown in FIGS. 2 and 3, arms 60, 60' project outward from the base 32 of the head 30 to a blunt forward region 62, 62' positioned above and over the uppermost cutting edge 54, 54' of fixed blades 48, 48'. Preferably, the arms 56, 56' extend over and encase a sufficient portion of each fixed blade 48, 48' so as to maintain the respective blades in essentially non-deformable fixed position relative to the head 30.

In the preferred embodiment, the base 32 of head 30 is integrally attached to the central region 56 of the head member 30 at a location opposed to the arms 56, 56'. Removable insertion and positioning of the base 36 in outwardly protruding end 24 of grip 12 enables the device to be used to pick fruit in the manner described subsequently. Upon dulling of the cutting edges 54, 54' and 52, 52' of the fixed blades 48, 48', the head 30 can be removed from the grip 12 of the device of the present invention and replaced with a fresh head member.

If desired, the device 10 of the present invention can include a suitable looped body hanger 26 attached to the second end 16 of grip 12. An example of one such looped hanger is rope 64 depicted in FIGS. 1 and 3. As depicted in FIG. 3, the respective ends of the rope 64 extend through a suitable aperture (not shown) into the interior of the outer sheath 20 of grip 12. The outer edges of the rope are knotted to maintain secure looped relationship of the roped member.

The device of the present invention can be configured from any suitable material. In the preferred embodiment, the materials chosen are selected for features such as durability, non-reactivity to water and plant material and characteristics such as light weight. The outer sheath 20 may be made of any suitable gripping material. The material may be resilient and/or cushioned to provide more comfort to the user during gripping of the device 10. The central body 20 may be configured from any suitable material such as metal or plastic. Similarly, the arms 60, 60' may be configured from any suitable durable plastic material. Fixed blades 48, 48' can be made of any suitable metal such as stainless steel or the like. Additionally, it is within the purview of this invention to configure the fixed blade from any suitable material which can maintain an effective cutting edge for severing stems during the picking operation.

To accomplish harvesting of fruits such as grapes, the device 10 of the present invention is grasped in the palm of the dominant hand of the user by grip 12 generally such that the head 30 projects from the hand between the forefinger F and thumb T of the user with the fingers firmly grasping grip 12. The user aims the device 10 such that projections 62, 62' lead first toward the base of the stem S of the bunch of grapes to be harvested. The bunch of grapes is seized with the other hand at the center of the bunch and the device is thrust forward toward the bunch. The stem is guided through the preliminary cutting region 56 into the primary cutting region 52. The stem, even when vitrified, is readily severed within the primary cutting region. This permits the freed fruit to be conveyed to the lug or suitable container while the pickers eyes and the hand grasping the device 10 of the present invention selects the next bunch for excision. In this manner, harvesting becomes a rhythmic two-handed operation.

Initial cutting action of the stem S can commence upon contact with one or the other cutting edges 54, 54'. Additionally, the convex curved surface region of cutting edges 54, 54' alone or in combination with blunt forward projections 62, 62' serves to guide the stem to be severed toward primary cutting region 52. Once in primary cutting region 52 the stem is contacted on opposed sides by cutting edges 48, 48' which impart opposed slice through a significant portion of the diameter of stem S. The weight of the grape bunch alone, or in combination with gentle tugging by the picker, will serve the remaining stem connections.

The head 30 of the device 10 of the present invention has a rearwardly oriented stop 64 defined at the inner junction of the outwardly projecting arms 60, 60' proximate to central body portion 32. The stop 64 provides a blunt stem contacting surface at the terminus of cutting edges 54, 54'. The blunt stem contacting surface is connected to two opposed angular surfaces 66 which taper outward from the blunt surface to a point of juncture with the central body portion 32. Forward thrusting of the device 10 of the present invention against a stem S conveys the stem through the primary cutting region 52 where opposed cuts are imparted on the stem. Forward momentum conveys the partially severed stem S against the stop 64 at an orientation which is longitudinally approximately equal to the newly imparted cuts and radially 90° opposed to the two cuts. Forward momentum combined with the impact location causes the weakened stem to deflect over the opposed annular surfaces 66. In its newly weakened condition, such deflection snaps the remaining stem connection.

As can be appreciated, the guarded guard housing 50 of the device of the present invention makes a device which is manifestly safer to use than scissors or unguarded bladed devices. Furthermore, the device 10 of the present invention eliminates much of the fatigue associated with the palm/finger motion and wear from manipulating scissors or other devices. Due to the configuration of the fixed blades 48, 48' and head 30, the blunt forward regions 62, 62' protect the picker's fingers from nicks and cuts which commonly occur when conventional shears are employed. Additionally, the device 10 of the present invention defines an extremely small blade opening and stationary cutting zone 56 which eliminates extraneous cutting of the vine to remove fruit during the cutting action. This is particularly important as the device 10 of the present invention can effectively harvest fruit while protecting shoots which provide nutrition for plants such as grape vines for the remainder of the season and will provide fruitful buds for crops in the future. Additionally, the narrow, slim blade opening 56 permits entry into tight difficult positions on the vine to sever the grape clusters stem. The grip 12 can be easily changed and the tool pulled or pushed to harvest the fruit. Finally, because the cutting blades 48, 48' are fixed relative to one another, the device provides advantages for cleaning, maintenance and prevention of worker fatigue.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A hand-held device for picking fruit, the fruit having a stem of a defined thickness, the device comprising:

an elongated grip member having a first end and an opposed second end; and a head attached to the first end of the elongated grip member, the head having a pair of fixed blades, each blade having a cutting edge, wherein the blades are oriented such that each respective cutting edge is essentially opposed to the first end of the elongated member and are positioned in opposed planar relationship to each other such that at least a portion of each respective cutting edge is in spaced opposed relationship to the other at a distance less than the thickness of the stem of the fruit to be picked;

wherein the cutting edge of each of the fixed blades has a convex curved cutting region positioned distal to the elongated grip member defining a blade opening area and an interior cutting area defined by an essentially straight portion of the cutting edges.

2. The device of claim 1 wherein the head further comprises a central body, means integrally connected to the central body for releasibly attaching the head to the elongated grip members, and at least two projections extending outward from the central body opposed to the attachment means, each projection encasing at least a portion of one of the respective fixed blades such that the associated cutting edge is exposed, the projections being symmetrically disposed to one another.

3. The hand-held device of claim 2 wherein each respective projection includes a blunt forward region at a terminal end of the respective projection, the blunt forward region extending over and beyond an outermost portion of the cutting edge of the associated fixed blade.

4. The device of claim 1 wherein the elongated grip member has a width sufficient to permit grasping within a hand of a user and wherein the blade opening defined by the convex curved cutting edge region of the pair of fixed blades is less than said width of said elongated grip member.

5. The device of claim 1 wherein the head comprises means for removably attaching the head to the elongated grip member.

6. The hand-held device of claim 5 wherein the removable attachment means comprises a member connected to the head opposed to the pair of fixed blades and projecting distally outward from the head, the base removably received within a mating opening defined in a first end of the elongated grip member.

7. A hand-held device for picking fruit, the fruit having at least a partially vitrified stem of a given thickness, the device comprising:

an elongated grip member having a width sufficient to be effectively grasped within one hand of a user, the elongated grip member further having opposed first and second ends; and a head attached to and projecting outward from the first end of the elongated grip member, the head comprising:

a) a central body positioned proximate and connected to the first end of the elongated grip member;

b) a pair of blades fixedly and symmetrically mounted in and extending outward from the central body at an orientation opposed to the first end of the elongated grip member, each blade having a cutting edge, wherein the blades are mounted in the head in planar relationship to each other to define a primary cutting region wherein at least a portion of each respective cutting edge is in spaced opposed relationship to the other at a distance less than the thickness of the stem of the fruit to be picked, the cutting edge comprising an interior cutting edge region disposed proximate to the central body and a convex curved cutting edge region distal to the central body, wherein the respective curved cutting edge regions are in symmetrical outwardly flared relationship to each other;

c) a pair of projections extending outward from the central body at a position opposed to the first end of the elongated grip member parallel to the fixedly mounted blades, the projections each encasing at least a portion of the respective fixed blade.

8. The device of claim 7 wherein the projections include blunt regions each having a curvilinear forwardmost surface positioned at the outermost distal regions of the respective projection, the projections and associated blunt regions having a length greater than the maximum length of the fixedly mounted blades; wherein the curvilinear forwardmost surfaces are disposed symmetrically to one another such that the stem of the fruit to be picked is guided into contact with the cutting edge of the fixed blades by forward action.

9. The device of claim 8 wherein each fixed blade comprises a dull surface encased in a respective projection and the cutting edge cutting edge surface comprising an interior cutting edge region disposed proximate to the central body and a convex curved cutting edge region wherein the cutting edge surfaces in the curved cutting edge region are in outwardly flared relationship relative to each other and opposed to the dull surface; wherein the convex cutting edge region defines a preliminary cutting area having a blade opening less than the maximum width of the elongated grip member and the interior cutting edge region defines an interior cutting area having a length comprising at least half of the total cutting edge length.

10. The device of claim 9 wherein each respective projection includes a curved blunt forward region at a terminal end of the associated projection, the curved blunt forward region extending over and beyond a forwardmost portion of the cutting edge of the associated fixed blade.

11. The device of claim 7 wherein the head further comprises a blunt central portion disposed between the two projections located proximate to the central body, the blunt central portion between and perpendicular to the terminus of the primary cutting region.

12. The device of claim 11 wherein the blunt central portion of the head comprises a central stem contacting surface and opposed tapered surfaces contiguous thereto extending from the stem contacting surface to the central body.

13. The device of claim 7 wherein head further comprises means for removably attaching the head to the first end of the elongated grip member, the removable attachment means connected to the central body opposed to the fixedly mounted blades.

14. The device of claim 13 wherein the removable attachment means comprises a member extending outward from the central body of the head, the member removably receivable within a mating opening defined in the first end of the grip member.

15. A hand-held device for picking fruit, the fruit having a vitrified stem of a given thickness, the device comprising:
   an elongated grip member having a width sufficient to be grasped within a palm of one hand of a user, the elongated member further having opposed first and second ends, the grip positionable such that the first end projects from the hand of the user lateral to the palm;
   a head attached to the first end of the elongated grip member, the head comprising:
   a) a central body positioned proximate to and in connection with the first end of the elongated grip member;
   b) a pair of blades fixedly mounted in and extending outward from the central body, each blade having a cutting edge, wherein the blades are mounted in opposed planar relationship to each other so that at least a portion of each respective cutting edge is in spaced opposed relationship to each other, wherein the cutting edge of each blade has a convex curved cutting region positioned distal to the elongated grip member defining a blade opening area and an interior cutting area defined by an essentially straight portion of the respective cutting edges disposed essentially parallel to one another;
   c) a pair of projections integral to and extending essentially symmetrically outward from the central body opposed to the first end of the elongated grip member and parallel to the fixedly mounted blades, the projections encasing a portion of the respective fixed blade opposed to the respective cutting edge; and
   d) a blunt central stem contacting portion disposed between the projections and the opposed cutting edges of the fixedly mounted blades; and
   means for releasibly connecting the head to the elongated grip member.

16. The device of claim 15 wherein the fixedly mounted blades when paired, define the blade opening area having a maximum opening less than the width of the elongated grip member, and the interior cutting area having a length egual to at least 50% of the total length of each respective cutting blade.

17. The device of claim 16 wherein each respective projection includes a curved forward region extending over and beyond a forwardmost portion of the cutting edge of the convex curved cutting edge region of the fixedly mounted blade.

18. The device of claim 16 wherein the elongated grip member defines an axis extending longitudinally therethrough, the head and the elongated grip being coaxially disposed relative to one another.

* * * * *